(12) United States Patent
Dahlheimer et al.

(10) Patent No.: US 6,283,256 B1
(45) Date of Patent: Sep. 4, 2001

(54) RETAINING SPRING DEVICE FOR A PARTIAL LINING DISK BRAKE HOUSING

(75) Inventors: Günther Dahlheimer, Mörfelden; Uwe Schwalm, Marburg; Thomas Bender, Bad Soden/Ts.; Michael Meiss, Friedberg; Hans-Dieter Leidecker, Eschborn; Jürgen Musolf, Frankfurt, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/269,859

(22) Filed: Aug. 19, 1999

(30) Foreign Application Priority Data

Oct. 4, 1996 (DE) ............................................. 196 40 930

(51) Int. Cl.⁷ ........................................................ F16D 65/40
(52) U.S. Cl. ............................... 188/73.38; 188/73.32; 188/73.35
(58) Field of Search ................................ 188/73.31, 73.35, 188/73.36, 73.37, 73.38, 370, 73.32

(56) References Cited

U.S. PATENT DOCUMENTS

| | | | |
|---|---|---|---|
| 3,625,314 | 12/1971 | Rinker | 188/73.35 |
| 4,214,649 | * 7/1980 | Fujimori et al. | 188/73.38 |
| 4,222,465 | * 9/1980 | Haraikawa et al. | 188/73.38 |
| 4,276,965 | * 7/1981 | Pickel | 188/73.35 |
| 4,467,897 | 8/1984 | Kubo et al. | 188/73.38 |
| 4,516,666 | * 5/1985 | Sheill | 188/73.38 |
| 4,609,077 | * 9/1986 | Nakatsuhara | 188/73.38 |
| 4,901,825 | * 2/1990 | Weiler | 188/73.35 |

FOREIGN PATENT DOCUMENTS 33 36 302  4/1985 (DE).
40 24 484  2/1992 (DE).

* cited by examiner

*Primary Examiner*—Robert J. Oberleitner
*Assistant Examiner*—Mariano Sy
(74) *Attorney, Agent, or Firm*—Rader, Fishman & Grauer PLLC

(57) ABSTRACT

A holding spring arrangement for a spot-type disc brake, in particular an integrated disc brake for automotive vehicles, wherein a brake carrier of the disc brake is integrated into the steering knuckle of the vehicle, and the holding spring includes at least one spring arm which extends generally in a circumferential direction and clamps the housing of the disc brake and the brake carrier to one another in a radial direction. To largely prevent tilting of the outward brake pad, according to the present invention, a holding element is provided for mounting the housing holding spring on the brake pad, which holding element is particularly made of sheet metal and supported on a part of the brake housing.

5 Claims, 1 Drawing Sheet

RETAINING SPRING DEVICE FOR A PARTIAL LINING DISK BRAKE HOUSING

TECHNICAL FIELD

The present invention relates to brake systems and more particularly relates to a holding spring arrangement for a housing of a spot-type disc brake.

BACKGROUND OF THE INVENTION

German patent application No. 33 36 302 discloses a holding spring for a housing of a spot-type disc brake which includes a leg which extends roughly tangentially to the brake disc and in parallel to the backplate of a brake pad. The free end portion of the leg resiliently bears against one of two supporting parts of the brake carrier. The spring has at least one arm which is rigidly connected to the backplate of the brake pad. The holding spring is made of one single wire portion and has a T-configuration. The lower end of the radially extending arm of the spring which faces the brake disc axis has a leg supported on the supporting part and extending in parallel to the two arms which are connected to the upper end of the radial arm and support the brake caliper. The length of the leg is sized so that it projects beyond the free end of the resilient arm.

German patent application No. 40 24 484 discloses a floating caliper for a spot-type disc brake, more particularly, a fist-type caliper brake, which is axially slidably mounted on a brake carrier and clamped with respect to the brake carrier by way of a housing holding spring. The housing holding spring is attached to the axially external leg of the floating caliper and has spring arms which extend generally in parallel to the brake disc, are pressed against the brake carrier in a radial direction and are displaceable relative thereto in an axial direction. The external leg has at least one projection at its open end on which the housing holding spring is locked against axial displacements relative to the floating caliper. Further, the housing holding spring has two fastening arms which are deflected with respect to the mid-portion and, with their bent-off ends, are hooked in openings of the axially external leg of the floating caliper.

German patent application No. 196 26 303.4 discloses a holding spring which is swivellably mounted on part of the disc brake, especially on the outward brake pad. This holding spring does not require machining for its attachment to the brake housing and can be fitted to the caliper in a preassembled condition. Also, the outward brake pad is fixed in the defined position so that transport of the assembly unit without loose parts is rendered possible.

An object of the present invention is to provide a holding spring of the type mentioned hereinabove which largely avoids tilting of the outward brake pad.

According to the present invention, this object is achieved by the provision of a holding element for mounting the housing holding spring on the brake pad, which holding element is particularly made of sheet metal and supported on a part of the brake housing.

The solution of the present invention permits in a simple way the provision of a mounting support which prevents the brake pad from tilting, both under delivery and operating conditions.

According to a preferred aspect of the present invention, the holding element has at least one arm for the support on the brake housing which extends, in particular, mainly in a tangential and/or axial direction.

Appropriately, the arm has an end portion for being supported on the brake housing. The arm expediently includes bent-off edge portions to provide a slip chamfer which facilitates the assembly.

In a very favorable fashion, according to another embodiment of the present invention, the holding element includes at least one further arm which forms a holding part for the spring and is integrally designed especially with the holding element.

DETAILED DESCRIPTION OF THE PREFERRED EMBODIMENTS

Figure 1:
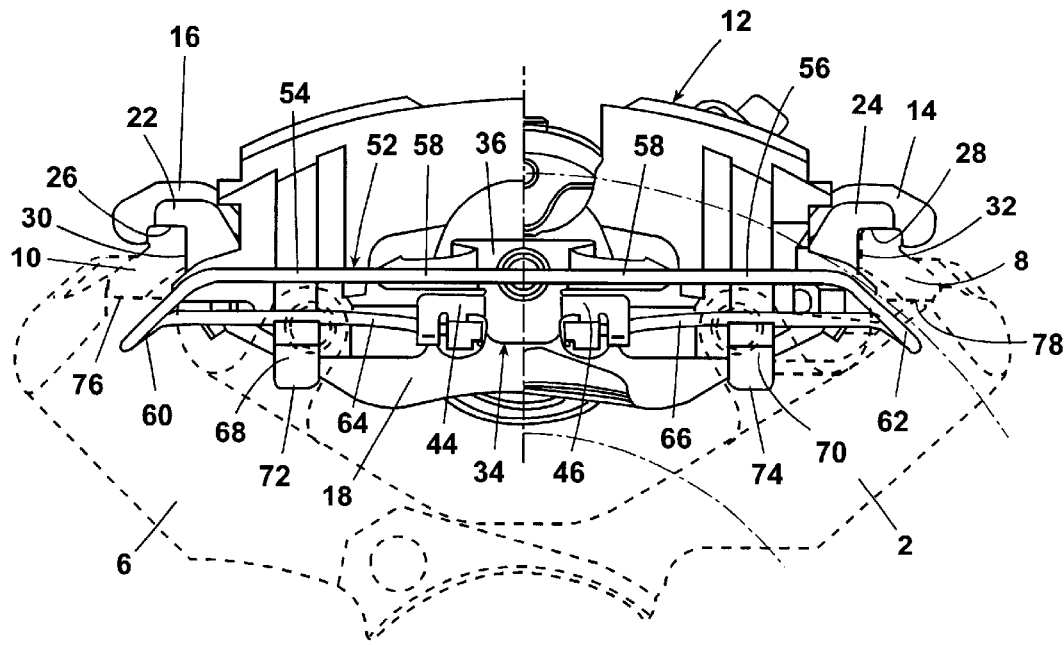
FIG. 1 is a front view of a spot-type disc brake.

The spot-type disc brake shown in FIG. 1 is an integrated type wherein the brake carrier 2 (shown in dotted lines) is integrated into the steering knuckle of a vehicle. Brake carrier 2 includes a portion 6 which extends generally in parallel to a brake disc (not shown), and two brake carrier arms 8, 10 which extend in paralell to the axis of the brake disc beyond said's edge. A brake housing 12 is axially slidably mounted on the brake carrier 2 and straddles the outside edge of the brake disc and two brake pads 14, 16 which are arranged on either side of the brake disc. The brake housing accommodates an actuating device (not shown) adapted to press the inward brake pad 14 against the brake disc so that the brake housing 12 displaces in an opposite direction and thereby also presses the outward brake pad 16 against the brake disc.

Each brake pad 14, 16 includes a backplate and a friction element attached to it. The backplates of the brake pads form ends 22, 24 by which the brake pads are supported and guided on the carrier arms 8, 10. The brake carrier arms 8, 10 provide each two abutment surfaces 26, 28 and abutment surfaces 30, 32 extending at angles relative to one another.

A holding element 34 is attached to the backplate 18 of the outward brake pad 16. The holding element 34 is made of sheet metal and has a base portion 36 which is used to attach the holding element to the backplate 18. The type of attachment of the holding element 34 may e.g. be as disclosed in patent application No. 196 26 303.4. Two legs 44, 46 extend from the base 36 away from the backplate.

The legs 44, 46 are bent several times and have at their ends holding parts 48, 50 for the housing holding spring 52. In addition, two further arms, which are also bent several times, extend from the base 36 of the holding element 34 generally in an axial/tangential direction, the arms having end portions 53, 55 at their ends.

The housing holding spring 52 is bent from one piece of wire and has two spring arms 54, 56 which extend in a tangential direction. The housing holding spring 52 includes a mid-portion 58 which has a generally straight configuration in the area of the outward leg of the brake housing and, in the areas projecting therefrom, is deflected roughly at an angle of 45° in relation to the brake carrier arms 8, 10. The end portions 60, 62 of the housing holding spring 52 are arranged below the brake carrier arms 8, 10, to what end the spring extends a short distance roughly in parallel to the brake carrier arms 8, 10. Thereafter, the spring passes over into free ends 64, 66 which extend generally tangentially. The free ends 64, 66 are embraced by holding parts 48, 50, as can be seen in FIG. 1. In the mounted condition (shown in dotted lines), the free ends 64, 66 bear against the top side of projections 68, 70 provided on the brake housing 12, and the mid-portion 58 of the housing holding spring engages from below noses 72, 74 formed by the projections 68, 70. The end portions 60, 62 of the housing holding spring bear against supporting surfaces 76, 78 of the brake carrier arms 8, 10.

Due to this attachment, the housing holding spring 52 is retained on the caliper in the preassembled condition and can, thus, also fix the outward pad 16 in the defined position, thereby permitting transport of the brake housing without loose parts. In the final assembly, the housing holding spring is swung about its axis of rotation provided by the free ends 64, 66 so that the end pieces 60, 62 of the housing holding spring are supported on the supporting surfaces 76, 78 of the brake carrier arms 8, 10.

Figure 2:
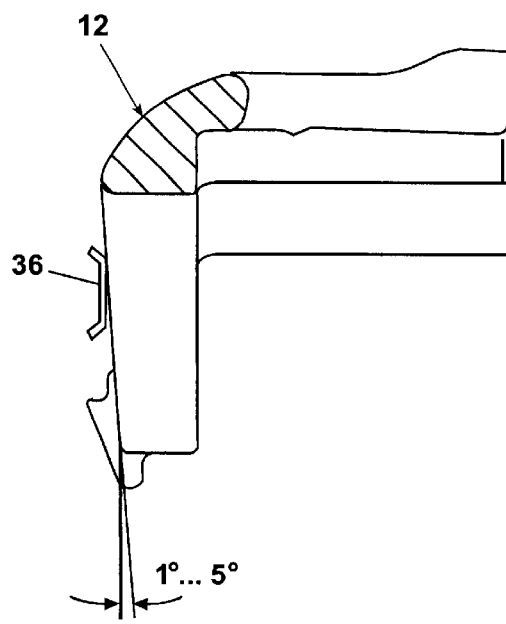
FIG. 2 is a schematic partial side view of the spot-type disc brake shown in FIG. 1, partly in cross-section.
Figure 3:
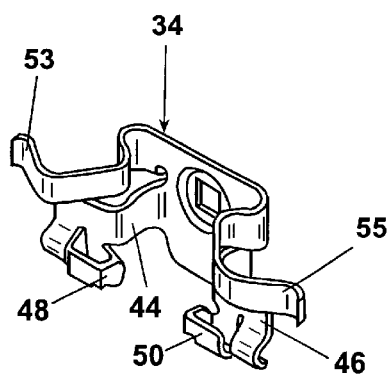
FIG. 3 is a total view of a holding element.

The end portions 53, 55 form two partial surfaces which extend roughly at an angle of 30 to 40° relative to each other and can be deflected at their edges to provide a slip chamfer which facilitates dismounting. To achieve a greatest possible moment, the end portions are in their radially farthest outward position when the brake pad is mounted. The end portion can be supported directly on the unmachined or machined external side of the brake housing, as can be seen in the FIG. 1 embodiment. The supporting surfaces can be arranged in axially retreated areas of the brake housing. The maximum effectiveness achieved with respect to the compensation of a tilting moment is increased still further because a draft angle of roughly 1 to 5° is provided on the external side of the brake housing (as shown in FIG. 2).

What is claimed is:

1. Holding spring arrangement for a disc brake, comprising:
   a holding spring including at least one spring arm which extends generally in a circumferential direction and clamps a disc brake housing and a brake carrier to one another,
   a holding element for mounting the holding spring on a brake pad, wherein the holding element is made of sheet metal and supported on a part of the disk brake housing, wherein said holding element further includes at least one further arm which forms a holding part for the holding spring.

2. Holding spring arrangement as claimed in claim 1, wherein the holding element has at least one brake housing arm for the support on the disk brake housing.

3. Holding spring arrangement as claimed in claim 2, wherein the brake housing arm extends mainly in at least one of a tangential and axial direction.

4. Holding spring arrangement as claimed in claim 2, wherein the brake housing arm includes an end portion for the support on the disk brake housing.

5. Holding spring arrangement as claimed in claim 4, wherein the end portion of the brake housing arm includes bent edge portions.

* * * * *